United States Patent
Hampton

[15] 3,654,844
[45] Apr. 11, 1972

[54] REFLEX CAMERA APPARATUS
[72] Inventor: Robert W. Hampton, Pittsford, N.Y.
[73] Assignee: Eastman Kodak Company, Rochester, N.Y.
[22] Filed: June 4, 1970
[21] Appl. No.: 43,525

[52] U.S. Cl. ...................................................95/42
[51] Int. Cl. ..............................................G03b 19/12
[58] Field of Search.......................................95/42

[56] References Cited

UNITED STATES PATENTS

| | | |
|---|---|---|
| 2,949,073 | 8/1960 | Weiss.............................................95/42 |
| 3,404,615 | 10/1968 | Proffitt, Jr. ...............................95/42 |
| 3,411,422 | 11/1968 | Sauer........................................95/42 |

Primary Examiner—Samuel S. Matthews
Assistant Examiner—Richard M. Sheer
Attorney—Robert W. Hampton and D. Peter Hochberg

[57] ABSTRACT

A flexible mirror in a reflex camera is normally positioned in the optical path of the camera lens to reflect a scene image to the viewfinder, and is displaced from the optical path to permit the scene image to be formed in the exposure plane by being moved into a non-viewing position when the shutter is released, wherein the mirror is in a rolled configuration.

6 Claims, 7 Drawing Figures

PATENTED APR 11 1972 3,654,844
SHEET 1 OF 2
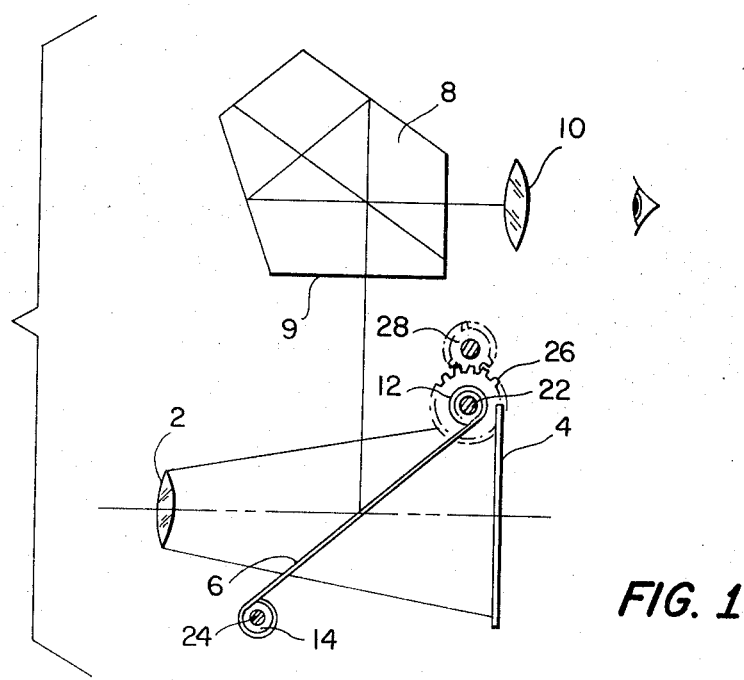
FIG. 1
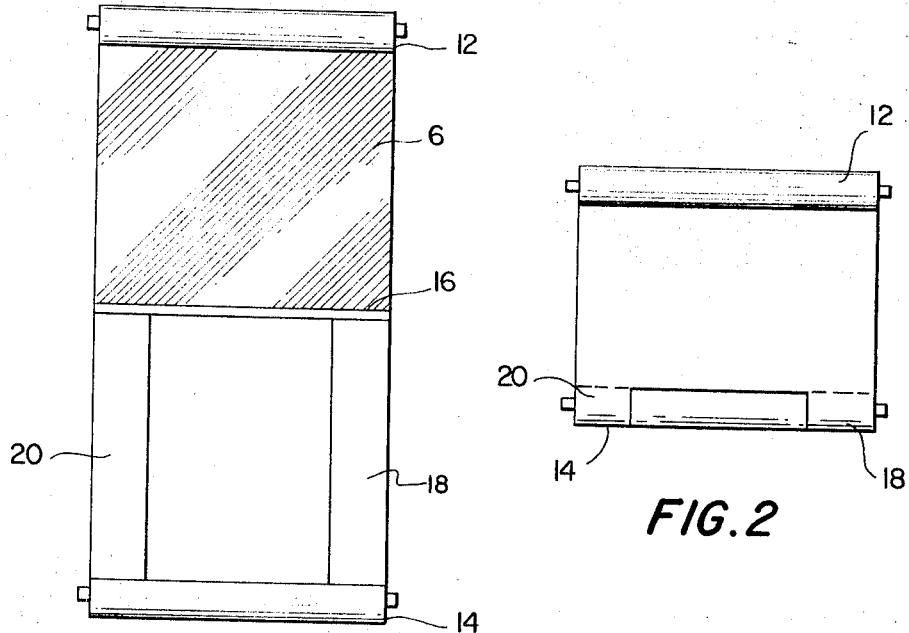
FIG. 3
FIG. 2
INVENTOR
ROBERT W. HAMPTON
BY *D. Peter Hochberg*
*Robert W. Hampton*
ATTORNEY

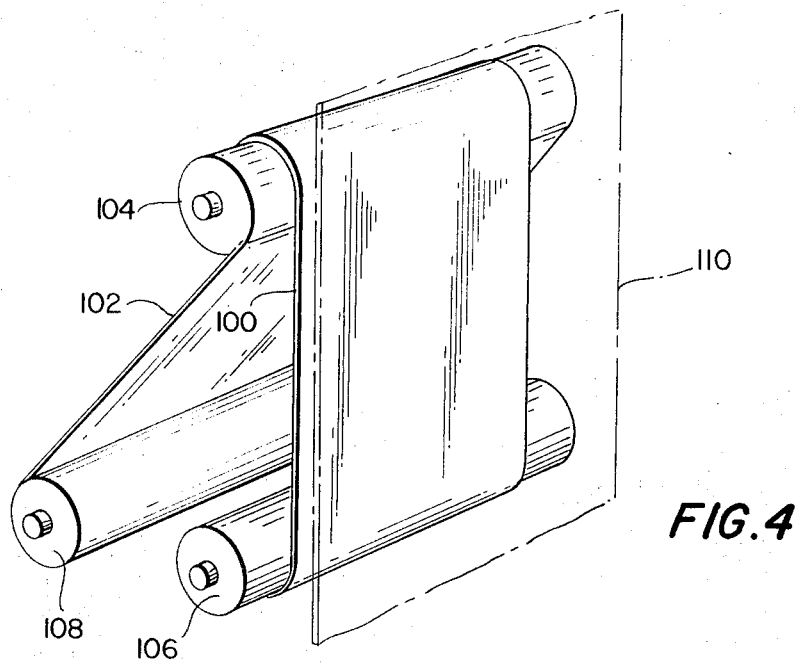
FIG.4
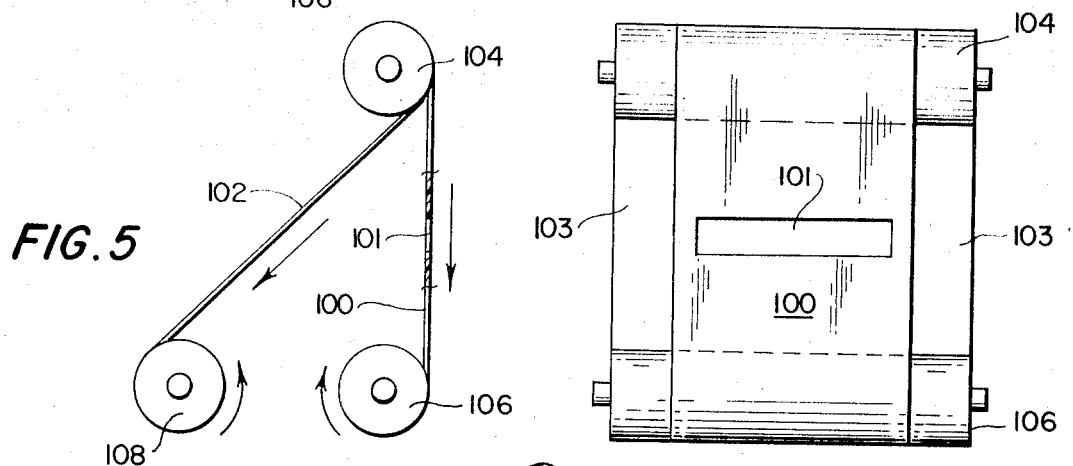
FIG.5
FIG.6
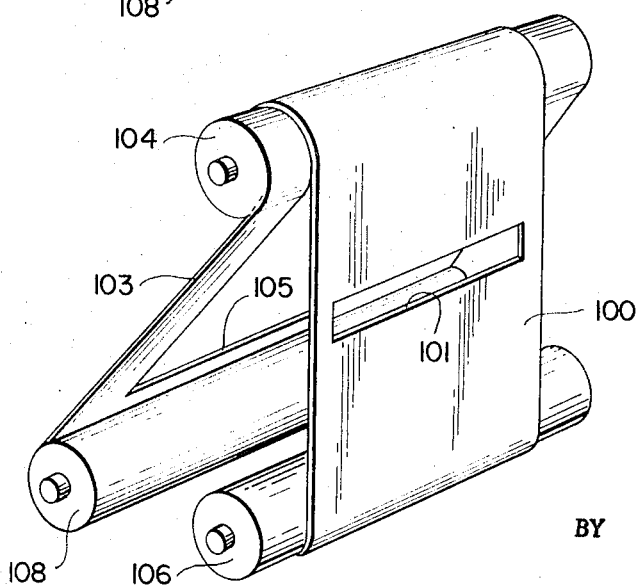
FIG.7
INVENTOR
ROBERT W. HAMPTON
BY D. Peter Hochberg
Robert W Hampton
ATTORNEY

REFLEX CAMERA APPARATUS

BACKGROUND OF THE INVENTION

1. Field of the Invention

The invention relates to single lens reflex cameras, and more particularly to the mirror employed in such cameras for reflecting a scene image to the viewfinder to enable the photographer to compose the picture and focus the camera.

2. Description of the Prior Art

A conventional single lens reflex camera comprises a rigid mirror mounted between the camera lens and the film plane for rotation into and out of the principal optical path of the camera, between active and inactive positions, respectively. Prior to exposure, the mirror is in its active position to block the optical path between the objective lens and the film plane and to reflect into the viewfinder light transmitted by the objective lens. The photographer then composes the picture and sets the camera according to the nature of the scene. To effect an exposure, the photographer releases the shutter; the mirror, which generally is coupled with the shutter release mechanism, pivots to clear the path between the lens and the film plane and is moved to its inactive position where normally it blocks the optical path from the lens to the viewfinder. In one type of reflex camera the mirror is automatically returned to its original, active position upon termination of the exposure. In another type of reflex camera, the mirror remains in its inactive position until the camera user performs some additional act such as cocking the shutter for the next exposure.

To simplify the use of reflex cameras it is desirable, as in other cameras, to adapt them for receiving preloaded film cartridges rather than film rolls. However, such cartridges normally occupy more space then the supply and take-up spools used with ordinary roll film. This has posed a serious problem in minimizing the overall camera dimensions while providing both cartridge receiving space and a path of movement for a swinging mirror. One approach to solving this problem has been in the use of a stationary, semi-transparency or "pellicle" mirror in the optical path for the dual purpose of reflecting a scene image to the viewfinder and transmitting light to the film plane during exposure. However, such mirrors neither give optimum reflection to the viewer nor optimum transmission to the film during exposure. Moreover, a practical pellicle mirror is quite thin and fragile and therefore highly susceptible to damage when the camera back is open for loading or unloading film.

SUMMARY OF THE INVENTION

The present invention comprises a flexible mirror for a single lens reflex camera. The mirror has an active position in which it extends between the camera lens and the film plane to reflect a scene image to the viewfinder, and has an inactive position in which it is rolled or otherwise compacted out of the optical path to enable exposures to be made. The flexible mirror requires substantially the same space as a pellicle mirror, yet it has the optical advantage of a swinging mirror in being opaque. Also, because it need not be semi-transparent it can be formed of materials that strongly resist damage.

A principal object of the present invention is to minimize the space required for the reflex mirror in a reflex camera.

Another object of the invention is to roll, fold or otherwise compact the reflex mirror of a reflex camera.

A further object of the invention is to mount and operate a reflex mirror in a cartridge loading reflex camera such as to minimize the size of such camera for a given size of film in such cartridge.

Another object of the invention is to reflect substantially all of the light transmitted by the objective lens of a single lens reflex camera into the camera viewfinder, by means occupying a relatively small space.

A more specific object of the invention is to provide a retractable mirror which requires a small space for operation, for reflecting a scene image to the viewfinder in a reflex camera.

Another object is to provide a mirror for a compact single lens reflex camera having a focal plane shutter.

A further object of the present invention is to provide a retractable mirror for a compact reflex camera which is economical to manufacture and incorporate in a camera. Other objects will be apparent from the description to follow and the appended claims.

BRIEF DESCRIPTION OF DRAWINGS

FIG. 1 shows a side view of a flexible mirror according to the invention as employed in a single lens reflex camera having a focal plane shutter;

FIG. 2 is a front view of the mirror assembly shown in FIG. 1;

FIG. 3 shows the mirror assembly of FIG. 2 in a completely extended position prior to mounting the assembly in a camera; and FIGS. 4–7 illustrate means for incorporating a mirror according to a modification of the invention in a focal plane single lens reflex camera, and the manner of operation of this means.

DESCRIPTION OF THE PREFERRED EMBODIMENTS

Briefly, the present invention comprises a flexible mirror used, for example, in a single lens reflex camera, which normally is extended to block the optical path from the camera objective to the film plane and to reflect light to the viewfinder, and which, during camera operation, is moved out of this path and compacted to permit exposure of the film. The mirror can be compacted by any of several means, for example by convoluting it about a take-up roller or by folding it in an accordian-like manner.

FIG. 1 shows the invention as incorporated in a single lens reflex camera, illustrated in schematic form. The camera comprises an adjustable lens 2 for focussing a scene image on a film plane 4, and a viewfinder assembly comprising a mirror 6, a pentaprism 8, and a viewfinder lens 10. Pentaprism 8, although not required, is generally preferred in single lens reflex cameras because it presents an upright, nonreversed image of the scene. Surface 9 of the viewfinder is preferably ground to produce a surface on which the scene is imaged for viewing clarity, and for focussing.

Mirror 6 comprises a flexible reflecting material, and is preferably a thin plastic membrane having a highly reflective surface formed, for example, by deposition of silver or aluminum. Metallic foil also is suitable. Mirror 6 is oriented between a take-up roller 12 and a feed roller 14, the rollers cooperatively exerting opposing forces across the nips of the mirror assembly held therebetween. When mirror 6 is in its active position (i.e., when reflecting a scene image to the viewfinder), it is in the optical path of lens 2 and at an angle to the axis of lens 2 as determined by the location of rollers 12 and 14, appropriate to reflect light into pentaprism 8 for presenting the scene image to the viewer. Rollers 12 and 14 are located outside of the optical path between lens 2 and film plane 4 so as not to obstruct the exposure light path when a picture is being taken. Rollers 12 and 14 are mounted for rotation about stationary shafts 22 and 24, respectively.

The mirror assembly is illustrated in FIG. 3 in an extended condition between spring driven feed roller 14 and take-up roller 12. Mirror 6 is fastened at one end directly to roller 12 by appropriate means. The other end of mirror 6 is connected to rigid cross brace 16, which is preferably formed of metal or plastic, and which serves to define a rigid linear end portion of mirror 6. Flexible ribbons 18 and 20 connect cross member 16 to roller 14, the latter being spring biased in a direction tending to unwind mirror 6 from take-up roller 12. Take-up roller 12 is releasably locked against the bias of roller 14, thereby keeping mirror 6 taut in all directions and thus preventing twisting of the mirror. Referring to FIG. 2, rollers 12 and 14 are separated by a distance such that when mirror 6 is extended therebetween, it is sufficiently taut as to yield a substantially flat optical surface, in order to enable it to reflect an undistorted image to the viewer.

In the operation of a single lens reflex camera, the mirror must not obstruct the optical path from the camera lens to the film during exposure. For ease and convenience of operation, mirror 6 is normally in this optical path to permit the photographer to view scenes at all times except during those instances when exposures are being made, and is removed therefrom in timed relation with the camera shutter. Thus, mirror 6 is withdrawn from the optical path between lens 2 and the film plane immediately prior to the opening of the shutter, and is returned to its active position immediately thereafter.

As mentioned earlier, the apparatus in FIG. 1 represents a camera employing a focal plane shutter (not shown). Take-up roller 12 is connected with the shutter drive by means of a gear train comprising gears 26 and 28. When the shutter is released and the curtain begins to carry the exposure slit across the film plane in a conventional manner, mirror take-up roller 12, driven by gears 26 and 28, is rotated in a counterclockwise direction (according to the structural arrangement in FIG. 1) to convolute mirror 6 thereon, thus overcoming the spring bias of feed roller 14, to permit light from lens 2 to pass between ribbons 18 and 20 and through the slit in the shutter curtain to expose the film. Thereafter, the coupling means between the shutter drive and the wind-up roller is released, and spring driven feed roller 14 rotates counterclockwise to unwind mirror 6 from take-up roller 12 to again permit the viewer to observe the scene through viewfinder lens 10. The means for releasing the coupling means from the wind-up roller may comprise means for disengaging gears 26 and 28 when the shutter operation is complete, or may comprise means for disengaging gear 28 from the curtain roller at this time.

FIGS. 4–7 show a modification of the invention wherein a flexible mirror 102 shares a common feed roller 104 with a curtain shutter 100 to provide greater compactness in the camera. Accordingly, curtain shutter 100 and the ends of a pair of connecting ribbons 103 (FIGS. 6 and 7) extending from the end of mirror 102 are normally wound on feed roller 104. The end of shutter 100 and the ends of ribbons 103 (FIGS. 6 and 7) extending from the trailing end of mirror 102 are fastened to roller 104 by appropriate means. FIG. 4 shows the relation of the elements of this embodiment in perspective, when the mirror is in viewing position. The leading end of mirror 102 is attached to a take-up roller 108, which is so located that mirror 102 is at the proper angle for reflecting the scene image received from the objective lens (not shown) to the camera viewfinder (not shown) as described previously. Likewise, the other end of shutter 100 is attached to take-up roller 106, such that shutter 100 is parallel with, and close to, film plane 110. A shutter exposure slit 101 is wound on roller 104 in FIG. 4. Rollers 106 and 108 are spring biased in clockwise and counterclockwise directions, respectively, thus tending to wind mirror 102 and shutter 100 on their respective take-up rollers, and roller 104 is releasably locked by the shutter release (not shown).

Upon actuation of the shutter release, mirror 102 and shutter 100 are urged towards and around their respective take-up rollers by the spring biases, as indicated by the arrows in FIG. 5. FIG. 6 is a front view of FIG. 5, and FIG. 7 shows the embodiment in perspective. FIGS. 6 and 7 indicate that the trailing end 105 of mirror 102 precedes shutter slit 101 across the film plane to permit proper exposure of the film. Ribbons 103 are spaced sufficiently far apart from each other so that the optical path from the camera lens to slit 101 is not blocked. Exposure terminates when the slit has travelled across the film frame. The mirror and shutter may be cocked for the next exposure by the provision of any well known means, such as by coupling feed roller 104 with the film advance means to cause counterclockwise rotation of roller 104 when the film is advanced, and by releasably locking roller 104 when mirror 102 and curtain 100 are wound thereon, or by the provision of an instant-return mechanism.

Many other possibilities exist for employing components common to both mirror and curtain operation as described above. Similar such arrangements are possible in film cartridge cameras, and, considerable miniaturization is conceivable in a focal plane, film cartridge camera. Provision could be made for the curtain and mirror to share a common pair of supply and take-up rollers. Thus, it may readily be seen that the flexible mirror of the invention makes possible great flexibility in the design of small reflex cameras.

The invention has been described in detail with particular reference to the preferred embodiments thereof, but it will be understood that variations and modifications can be effected within the spirit and scope of the invention.

I claim:

1. In a single lens reflex camera having an exposure plane, an objective lens for transmitting light along an optical path to the exposure plane, a viewfinder, and a mirror for alternatively transmitting light to the viewfinder or the exposure plane, the improvement wherein:
    the mirror is made of a flexible material and has a first position wherein said mirror is displaced from the optical path and said mirror is in a rolled configuration, and a second position wherein said mirror is interposed between the objective lens and the exposure plane for reflecting light from the optical path to the viewfinder; and
    the camera includes:
    means for holding said mirror in a rolled configuration when said mirror is in said first position; and
    means for moving said mirror between said first and second positions.

2. The invention according to claim 1 wherein said mirror is in a planar condition when said mirror is in said second position, and the improvement further comprises means for releasably holding said mirror in said second position.

3. A single lens reflex camera comprising:
    an exposure plane;
    a viewfinder;
    an objective for transmitting light along an optical path to form an image in said exposure plane;
    a mirror made of a flexible material having first and second ends, said mirror having a first position in which said mirror is in a planar configuration and is disposed in said optical path to reflect light passing through said objective to said viewfinder, and said mirror having a second position in which said mirror is displaced from the optical path and said mirror is in a rolled configuration;
    a first rotatable roller coupled to said first mirror end;
    a second rotatable roller coupled to said second mirror end;
    means for rotating said first roller to put said mirror into said first position; and
    means for rotating said second roller to roll said mirror into said second position.

4. A camera according to claim 3 further comprising:
    means actuatable for making an exposure; and
    means for actuating said second roller rotating means in response to actuation of said exposure making means.

5. A camera according to claim 4 further comprising:
    means for actuating said first roller rotating means in response to the making of an exposure.

6. A single lens reflex camera comprising:
    an exposure plane;
    an objective for transmitting light along an optical path to form an image in said exposure plane;
    a viewfinder displaced from said optical path;
    a mirror made of a flexible material having a viewing position in said optical path for reflecting light passing through said objective to said viewfinder, and a non-viewing position wherein said mirror is in a rolled configuration; and
    means for moving said mirror between said viewing position and said non-viewing position.

* * * * *